(12) United States Patent
Luo et al.

(10) Patent No.: US 6,462,902 B1
(45) Date of Patent: Oct. 8, 2002

(54) INDEPENDENT CLAMPING SPACERS IN A DISC DRIVE ASSEMBLY

(75) Inventors: Erming Luo, Moore; Roy L. Wood, Yukon; John D. Stricklin, Oklahoma City, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/326,066

(22) Filed: Jun. 4, 1999

Related U.S. Application Data
(60) Provisional application No. 60/088,062, filed on Jun. 5, 1998.

(51) Int. Cl.[7] .............................................. G11B 17/038
(52) U.S. Cl. ................................. 360/99.12; 369/98.08
(58) Field of Search .......................... 360/99.08, 99.12, 360/99.05, 135, 98.07; 369/75.1, 75.2

(56) References Cited

U.S. PATENT DOCUMENTS

| | | | | |
|---|---|---|---|---|
| 5,274,288 A | * | 12/1993 | Stefansky | ................ 360/99.08 |
| 5,430,590 A | * | 7/1995 | Ainslie et al. | ........... 360/98.07 |
| 5,459,528 A | * | 10/1995 | Brooks | ..................... 360/99.08 |
| 5,706,148 A | * | 1/1998 | Faris | ....................... 360/98.07 |

* cited by examiner

Primary Examiner—Brian E. Miller
Assistant Examiner—Tianjie Chen
(74) Attorney, Agent, or Firm—Crowe & Dunlevy

(57) ABSTRACT

Apparatus and method for individually clamping discs in a disc stack assembly to improve mechanical shock resistance of a disc drive. A clamping spacer includes a circumferentially extending body portion having a hub contact surface rigidly affixable to a hub of a spindle motor used to rotate first and second discs. The clamping spacer further includes top and bottom spring flanges which extend radially from the body portion away from the spindle motor hub so that the body portion and the spring flanges form a generally c-shaped cross-section. When the body portion is affixed to the spindle motor hub above the first disc and below the second disc, the bottom spring flange exerts a first axially directed clamping force upon the first disc and the top spring flange independently exerts a second axially directed clamping force upon the second disc.

10 Claims, 6 Drawing Sheets

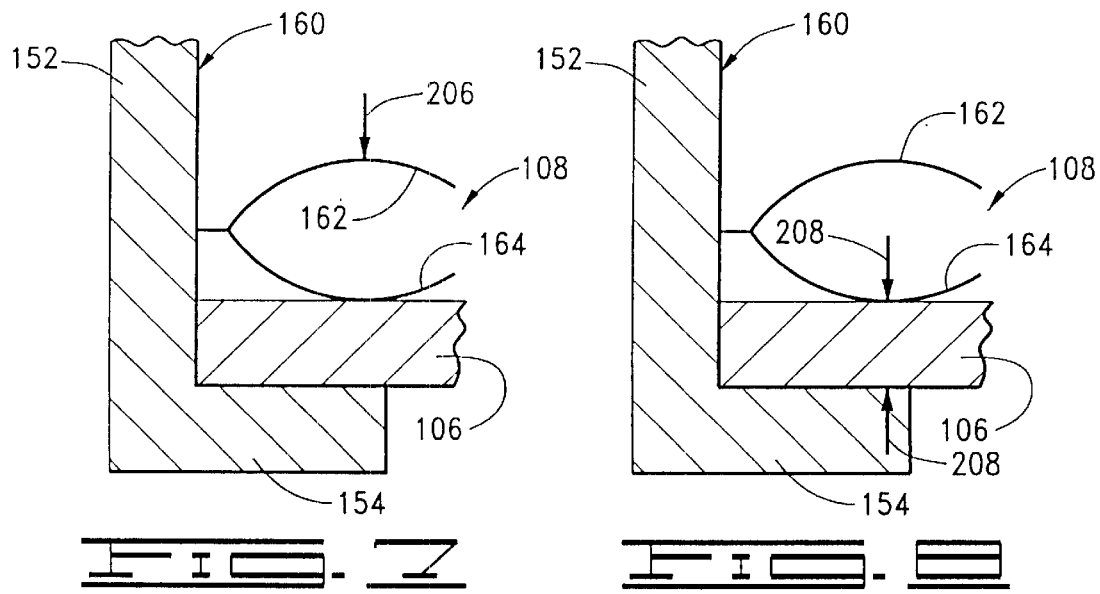
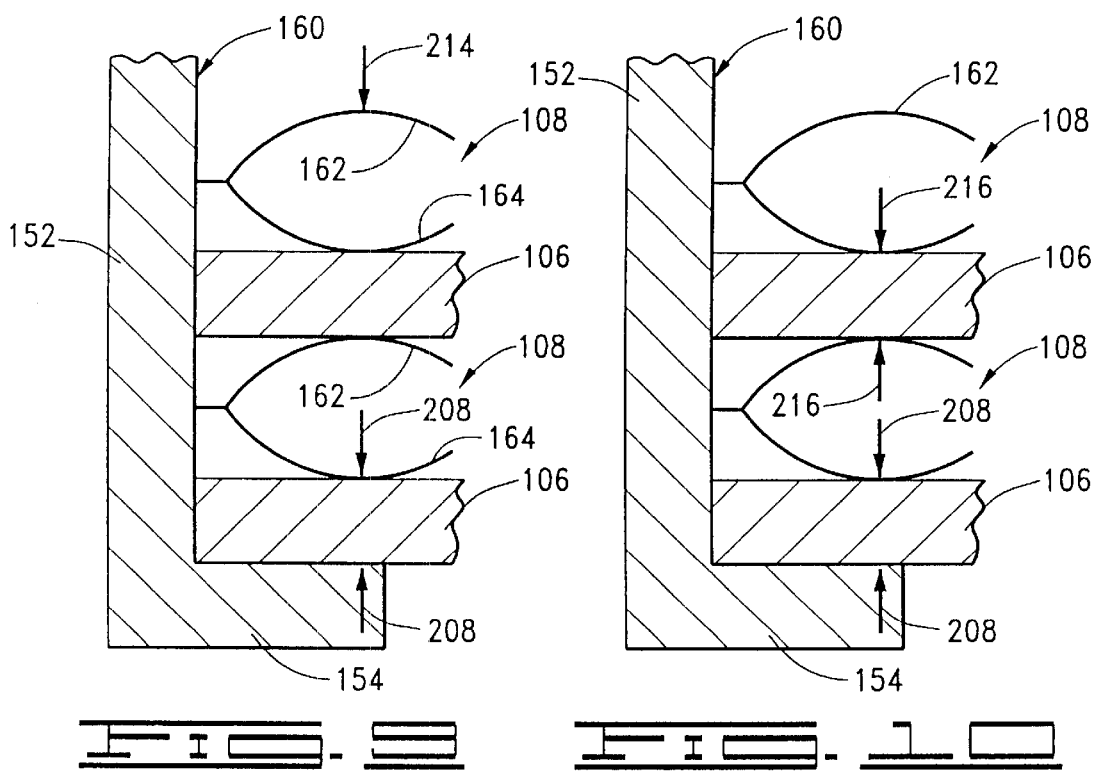

INDEPENDENT CLAMPING SPACERS IN A DISC DRIVE ASSEMBLY

RELATED APPLICATIONS

This application claims the benefit of U.S. Provisional Application No. 60/088,062 filed Jun. 5, 1998.

FIELD OF THE INVENTION

This invention relates generally to the field of hard disc drive data storage devices and more particularly, but not by way of limitation, to improving mechanical shock resistance of a disc drive by individually clamping discs in a disc stack assembly of the disc drive.

BACKGROUND OF THE INVENTION

Data storage devices of the type known as "Winchester" disc drives are well known in the industry. Such devices magnetically record digital data on a plurality of circular, concentric data tracks on the surfaces of one or more rigid discs. The discs are typically mounted for rotation on the hub of a brushless direct current spindle motor. In disc drives of the current generation, the discs are rotated at speeds of up to 10,000 revolutions per minute.

Data are recorded to and retrieved from the discs by an array of vertically aligned read/write head assemblies, or heads, which are controllably moved from track to track by an actuator assembly. Each head typically comprises electromagnetic transducer read and write elements which are carried on an air bearing slider. The slider acts in a cooperative hydrodynamic relationship with a thin layer of air dragged along by the spinning discs to fly each head in a closely spaced relationship to the disc surface. In order to maintain the proper flying relationship between the heads and the discs, the heads are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to a disc drive housing base member at a location closely adjacent an outer edge of the discs. The pivot shaft is mounted such that its central axis is normal to the plane of rotation of the discs. An actuator bearing housing is mounted to the pivot shaft by an arrangement of precision ball bearing assemblies, and supports, in turn, a flat coil which is immersed in a magnetic field of an array of permanent magnets which are fixedly mounted to the disc drive housing base member.

On the side of the actuator bearing housing opposite to the coil, the actuator bearing housing also typically includes a plurality of vertically aligned, radially extending actuator head mounting arms to which the head suspensions mentioned above are mounted. When current is applied to the coil, a magnetic field is formed surrounding the coil which interacts with the magnetic field of the permanent magnets to rotate the actuator bearing housing about the pivot shaft, thereby moving the heads across the disc surfaces.

Disc drives of the current generation are included in desk-top computer systems for office and home environments, as well as in laptop computers which, because of inherent portability, can be used wherever they can be transported. Because of this wide range of operating environments, the computer systems, as well as the disc drives incorporated in them, must be capable of reliable operation over a wide range of ambient temperatures. Laptop computers can further be subjected to large magnitudes of mechanical shock as a result of handling. It is common in the industry, therefore, to require disc drives to operate over a wide range of ambient temperatures as well as to be able to withstand substantial mechanical shocks without becoming inoperable.

One of the areas of disc drive design which is of particular concern when considering ambient temperature variations and mechanical shock resistance is the system used to mount the discs to the spindle motor. During manufacture the discs are mounted to the spindle motor in a temperature and cleanliness controlled environment. Once mechanical assembly of the disc drive is completed, special servowriters are used to prerecord servo information on the discs. This servo information is used during operation of the disc drive to control the positioning of the actuator used to move the read/write heads to the desired data location in a manner well known in the industry. Once the servo information has been recorded on the discs, it is essential that the servo information, and all data subsequently recorded, spin in a concentric relation to the spin axis of the spindle motor. The discs, therefore, must be mounted to the spindle motor in a manner that prevents shifting of the discs relative to the spindle motor when subjected to a mechanical shock.

Several systems for clamping discs to spindle motor hubs have been disclosed in the prior art, including U.S. Pat. No. 5,528,434, issued to Bronshvatch et al. on Jun. 18, 1996; U.S. Pat. No. 5,517,376, issued to Green on May 14, 1996; U.S. Pat. No. 5,452,157, issued to Chow et al. on Sep. 19, 1995; U.S. Pat. No. 5,333,080, issued to Ridinger et al. on Jul. 26, 1994; U.S. Pat. No. 5,274,517, issued to Chen on Dec. 28, 1993; and U.S. Pat. No. 5,295,030, issued to Tafreshi on Mar. 15, 1994, all assigned to the assignee of the present invention. In each of these disc clamping systems the spindle motor includes a disc mounting flange that extends radially from a lower end of the spindle motor hub. A first disc is placed over the hub during assembly and brought to rest on this disc mounting flange. An arrangement of disc spacers and additional discs are then alternately placed over the hub until the intended "disc stack" is formed. Finally, a disc clamp of selected construction (such as spring or shrink-fit) is attached to the spindle motor hub to exert an axially directed clamping force against the uppermost disc in the disc stack. This axial clamping force is passed through the discs and disc spacers and squeezes the disc stack between the disc clamp and the disc mounting flange. This technique requires that the resulting friction between the clamp and top disc and between the bottom disc and disc mounting flange be sufficient to resist movement of the entire disc pack in response to a shock event.

With an industry trend toward size reduction in the overall disc drive, the size of various components within the disc drive has necessarily been reduced, including the thickness of the discs. As the discs have become thinner, the amount of clamping force that can be applied to the discs without causing mechanical distortion of the discs is limited. That is, variation in the flatness of the disc mounting flange, the discs, and the disc spacers contribute to flatness concerns of the discs relative to the heads. The elastic modulus of the disc material, too, affects the flatness of the joined assembly providing the disc pack. These and other factors limit the axial clamping force that can be applied using presently available techniques.

With continued demand for ever increasing levels of mechanical shock resistance, there remains a continued need for improvements in the manner in which discs are clamped to the spindle motors of disc drives. It is to such improvements that the present invention is directed.

SUMMARY OF THE INVENTION

The present invention is directed to an apparatus and method for improving mechanical shock resistance of a disc drive.

As exemplified by preferred embodiments, a disc drive includes a spindle motor with a rotatable hub having a circumferentially extending hub outer surface and a disc support member. The rotatable hub is configured to rotate at least first and second discs.

One or more clamping spacers provide inter-disc spacing as well as independent clamping of the discs to the spindle motor hub. Each clamping spacer includes a circumferentially extending body portion having a hub contact surface rigidly affixed to the hub outer surface. The clamping spacer further includes top and bottom spring flanges (also referred to as "first" and "second" spring flanges) which extend radially from the body portion away from the spindle motor hub so that the body portion and the spring flanges form a generally c-shaped cross-section. Once the clamping spacer is affixed to the spindle motor above the first disc and below the second disc, the bottom spring flange exerts a first clamping force upon the first disc and the top spring flange independently exerts a second clamping force upon the second disc. This fixing of the clamping spacer directly to the spindle motor hub radially isolates each disc from the remaining discs.

Preferably, the discs are assembled by loading the first disc onto the spindle motor hub to bring the first disc to rest upon the disc support member. The first clamping spacer is next assembled onto the spindle motor hub. This is preferably carried out by affixing the first clamping spacer to the hub outer surface while applying an axially directed clamping force to the first clamping spacer so that, once the first clamping spacer is affixed to the hub outer surface, the desired clamping force is exerted upon the first disc by the bottom spring flange of the first clamping spacer.

The second disc is loaded onto the spindle motor hub and brought to rest onto the top spring flange of the first clamping spacer. The second clamping spacer is then assembled onto the hub outer surface. This is preferably accomplished by imparting an axially directed force to the second clamping spacer so that, once the second clamping spacer is affixed to the hub outer surface, the desired clamping force is exerted upon the second disc by the top spring flange of the first clamping spacer and the bottom spring flange of the second clamping spacer. Thermal expansion operations are preferably carried out to achieve interference fits between hub outer surface and the first and second clamping spacers, respectively.

By individually affixing each spacer to the hub outer surface, thereby individually clamping the discs, the clamping spacers improve the mechanical shock resistance of the disc drive, as the reactive mass of the disc stack is divided out into separate components (i.e., the individual discs). Hence, instead of moving as a single large mass reacting on only two friction surfaces, each of the discs is individually held by two friction surfaces, thereby requiring less clamping force to prevent disc shifting; moreover, substantially greater levels of mechanical shock resistance can be achieved using the same clamping force on individual discs, as compared to that same clamping force on an entire, unified stack.

These and various other features as well as advantages which characterize the present invention will be apparent from a reading of the following detailed description and a review of the associated drawings.

BRIEF DESCRIPTION OF THE DRAWINGS

FIGS. 7–10 are schematic representations of the clamping spacers of FIGS. 3–6, generally illustrating the sequential assembly of the discs and clamping spacers onto the spindle motor hub.

DETAILED DESCRIPTION OF THE INVENTION

Figure 1:
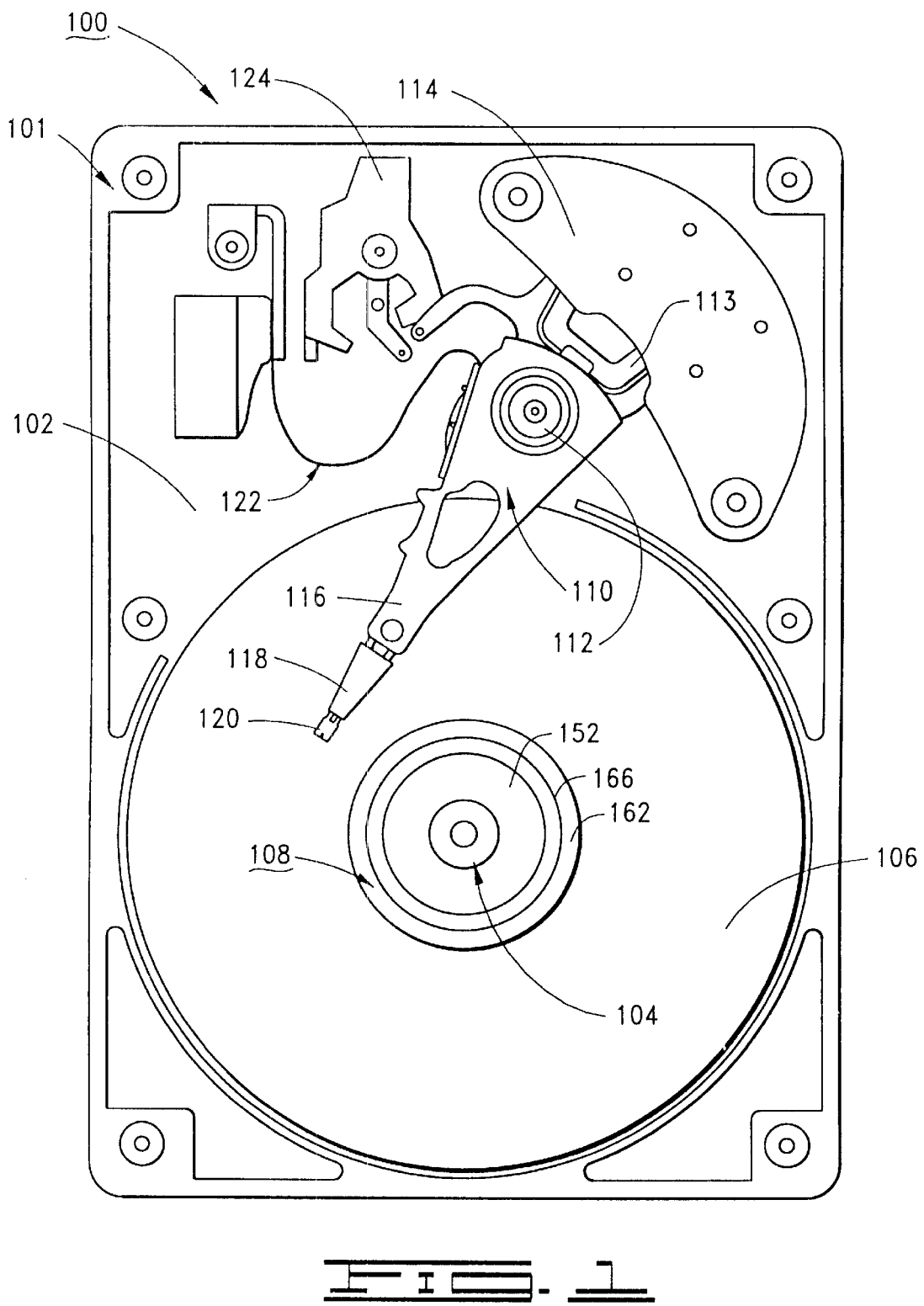
FIG. 1 is a top plan view of a disc drive constructed in accordance with preferred embodiments of the present invention.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) which is mounted to the underside of the HDA. Although not visible in FIG. 1, it will be understood that the PWA is used to control the operation of the HDA 101.

A top cover (omitted from FIG. 1) mates with a base deck 102 to provide an environmentally controlled environment for the HDA 101. A spindle motor (generally designated at 104) is supported by the base deck 102 and rotates a plurality of axially aligned discs 106 at a constant high speed. As discussed in greater detail below, a corresponding plurality of clamping spacers (the topmost of which is shown at 108) are used to provide inter-disc spacing as well as to individually clamp the discs 106 relative to the spindle motor 104 to improve the mechanical shock resistance of the disc drive 100.

The discs 106 include recording surfaces (not separately identified in FIG. 1) to which user data are written by way of a rotary actuator 110, which rotates about a cartridge bearing assembly 112 in response to the application of current to a coil (113, a portion of which is visible in FIG. 1) of a voice coil motor (VCM) 114. The actuator 110 includes a plurality of rigid arms 116, each of which supports a corresponding flexible suspension assembly 118. Each suspension assembly 118 in turn supports a head 120 over each of the respective recording surfaces of the discs 106 by an air bearing established by air currents set up by the high speed rotation of the discs 106. It will be noted that the suspension assemblies 118 provide spring forces which urge the heads 120 toward the respective disc surfaces, and the heads 120 are provided with aerodynamic features that fly the heads 120 over the disc surfaces in a highly stable manner.

A flex circuit assembly 122 facilitates electrical interconnection between the actuator 110 and the disc drive PWA. A latch 124 secures the actuator 110 when the disc drive 100 is deactivated, allowing the heads 120 to safely come to rest upon landing zones (not separately identified) located at the innermost radii of the discs 106. The landing zones are preferably texturized to prevent stiction forces from undesirably adhering the heads 120 to the landing zones.

Figure 2:
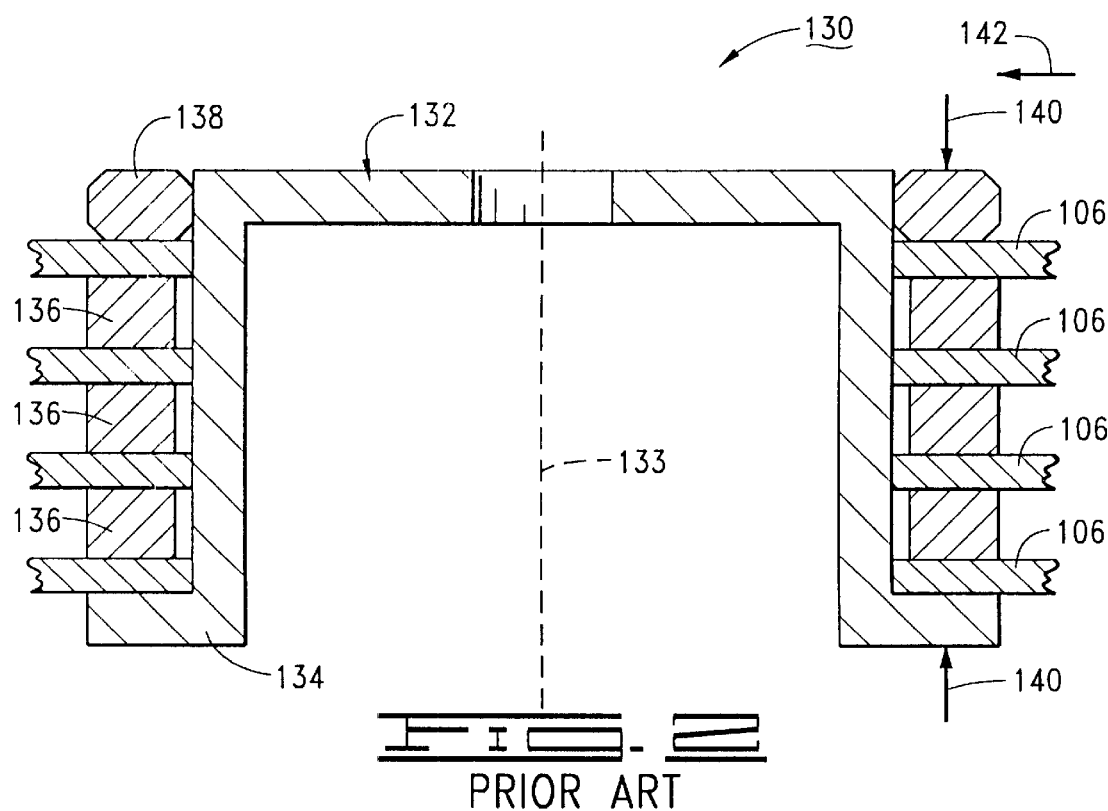
FIG. 2 is an elevational, cross-sectional view of a prior art spindle motor.

Referring now to FIG. 2, shown therein is an elevational, cross-sectional view of portions of a prior art spindle motor assembly 130 which utilizes axial loading to secure the discs 106. As interior portions of the spindle motor 130 are not germane to the present discussion, for purposes of clarity such have been omitted from FIG. 2.

A rotatable hub 132 of the spindle motor 130 rotates about a central axis 133 and includes a radially extending disc support flange 134. A plurality of discs 106 (nominally identical to the discs of FIG. 1) and disc spacers 136 are arranged about an outer hub surface (not designated) to form a disc stack. The disc stack is assembled by placing a first one of the discs 106 over the hub 132 to rest against the disc support flange 134. Disc spacers 136 and discs 106 are alternately added to the stack until a desired number of discs 106 have been positioned (four in this example). A disc clamp 138 is then assembled to the upper end of the hub 130 to complete the assembly.

In FIG. 2, the disc clamp 138 is a "shrink-fit" clamp which has an inner diameter that is nominally smaller that the outer diameter of the hub 132. Assembly is accomplished by heating the clamp 138 so that thermal expansion permits the clamp 138 to pass over the hub 132. A desired magnitude of axial loading is applied to the disc clamp 138 while the clamp 138 is allowed to cool and shrink fit onto the hub 132. Other examples of disc clamp configurations include spring clamps, such as discussed in previously mentioned U.S. Pat. Nos. 5,274,517 and 5,295,030.

The axial clamping forces applied by the disc clamp 138 and the disc support flange 134 are schematically illustrated by vectors 140. It will be noted that the selected material and geometry of the disc clamp 138 will generally determine the maximum amount of axial clamping force that can be exerted by the clamp. A drawback to such a clamping methodology is the limitation in the amount of axially directed clamping force that can be provided without deformation or damage to the disc stack.

By way of illustration, a radially directed mechanical shock applied to the disc stack (such as in the direction of vector 142), if greater than the resistive force established by the disc clamp 138 and the disc support flange 134, will tend to undesirably shift the entire set of discs 106 and disc spacers 136 in a direction toward the central axis 133. This will tend to introduce eccentricities in the tracks defined on the disc surfaces and may detrimentally affect (or prevent) recovery of previously stored data. Particularly, the magnitude of the radially directed shock force $F_S$ can be described as:

$$F_S = (m_{DS})(a_S) \quad (1)$$

where $m_{DS}$ represents the mass of the total number of discs 106 and spacers 136 and $a_S$ represents the acceleration of the radially directed shock force (such as, for example, 200 g). The normal force $F_N$ exerted by the disc clamp necessary to resist a resulting shift in the discs 106 and spacers 136 can be described as:

$$F_N = F_S/\mu \quad (2)$$

where $\mu$ represents the coefficient of friction between the clamp 138 and the top disc 106 and between the disc support flange 134 and the bottom disc 106 (such as, for example, $\mu=0.15+0.15=0.3$).

Using a mass of 0.17 kilograms (corresponding to 0.37 pounds, lbs) for a stack comprising five discs 106 and four corresponding spacers 136, a normal (clamping) force $F_N$ of about 1000 newtons (corresponding to about 225 lbs-force) would be required to resist a 200 g radially directed mechanical shock.

To meet greater levels of mechanical shock resistance, such as 500 g, it would seem that all would be required would be to merely increase the clamping force exerted by the disc clamp 138. However, there is an upper limit to the amount of clamping force that can be imparted by the clamp before damage is imparted to the disc stack. For example, it has been found that using a clamping force of about 1100 newtons (about 250 lbs-force) can induce coning or warping to the discs 106.

Figure 3:
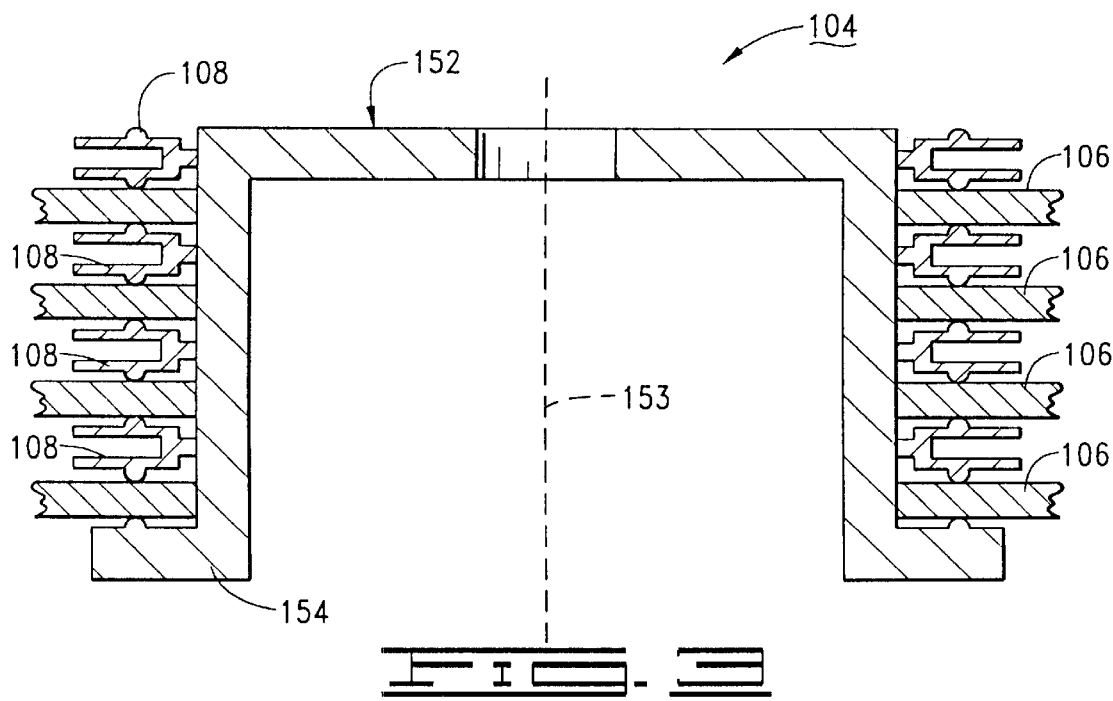
FIG. 3 is an elevational, cross-sectional view of the spindle motor of FIG. 1 illustrating the use of clamping spacers constructed and assembled in accordance with preferred embodiments of the present invention.
Figure 4:
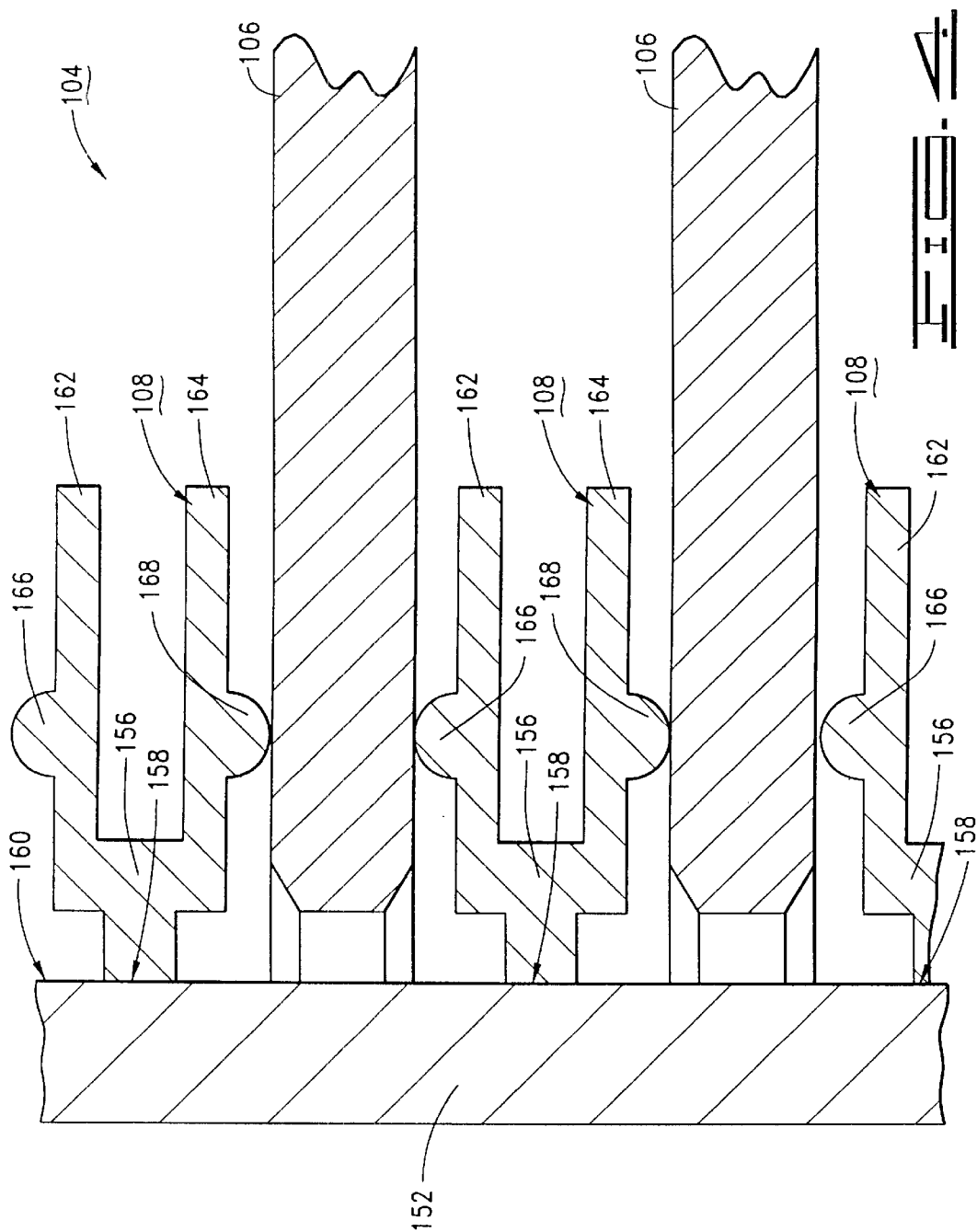
FIG. 4 illustrates various features of the clamping spacers of FIG. 3 in greater detail.
Figure 5:
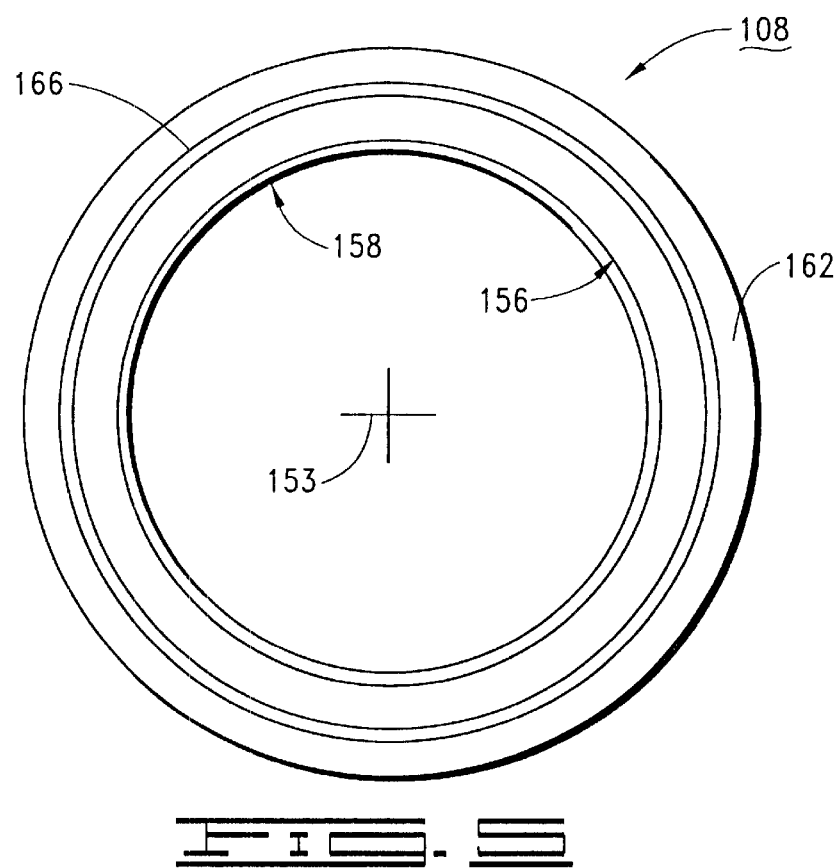
FIGS. 5 and 6 are top plan and perspective views, respectively, of a selected clamping spacer from FIGS. 3 and 4.
Figure 6:
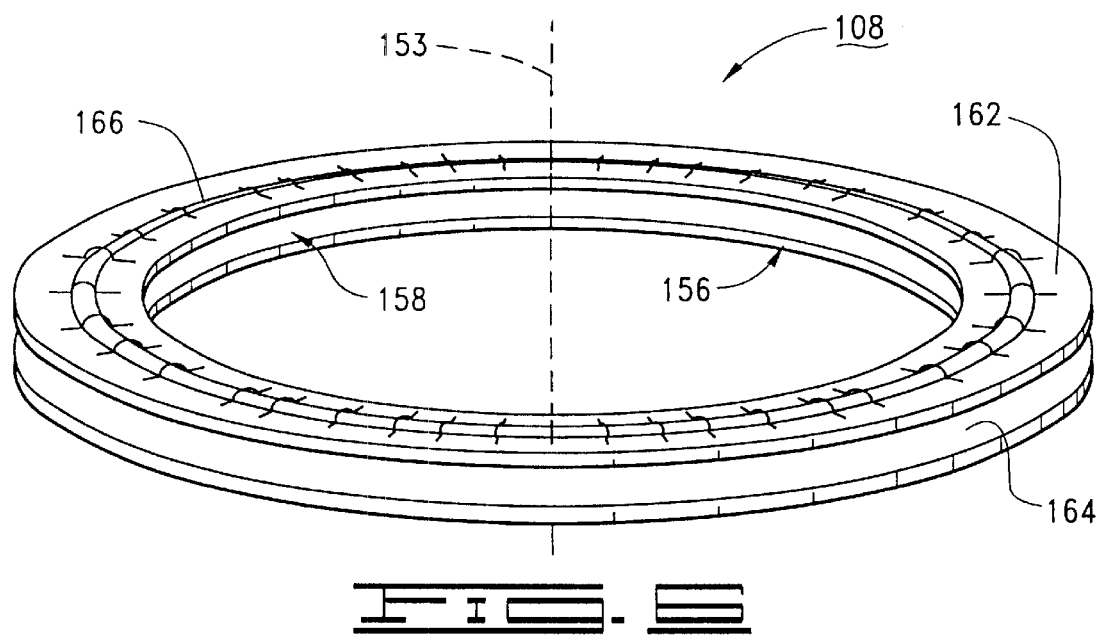

Accordingly, FIGS. 3–6 have been provided to illustrate the use of the clamping spacers 108 (FIG. 1) which provide individual disc clamping in order to achieve substantially greater levels of mechanical shock resistance. FIG. 3 shows an elevational, cross-sectional view of the spindle motor 104 of the disc drive 100 of FIG. 1. FIGS. 4–6 illustrate various features of the clamping spacers 108 in greater detail.

As shown in FIG. 3, the spindle motor 104 includes a rotatable hub 152 which is configured for rotation about a central axis 153. A disc support flange 154 radially extends from the rotatable hub 152 to support the discs 106 and clamping spacers 108.

As shown in FIG. 4, each clamping spacer 108 includes a body portion 156 having an inwardly directed, circumferentially extending hub contact surface 158 which is rigidly affixed to a circumferentially extending outer surface 160 of the hub 152. As discussed below, an interference fit using thermal expansion is preferably achieved to rigidly affix the hub contact surface 158 to the hub outer surface 160, although other methodologies are readily contemplated, as desired.

Each of the clamping spacers 108 further includes a pair of spring flanges which circumferentially extend from the body portion 156 in a direction radially away from the central axis 153. Using normal orientation conventions for the spindle motor 104 so that the central axis 153 (FIG. 3) is considered to extend in a vertical direction and the disc support flange 154 is considered to be near the bottom of the hub 152, the spring flanges are respectively identified as top spring flanges 162 and bottom spring flanges 164. Hereinbelow, the top and bottom spring flanges 162, 164 are also referred to as "first" and "second" spring flanges. It will be noted that the body portion 156 and the spring flanges 162, 164 form a generally c-shaped cross-section.

Radially extending contact nodes (also referred to as bumps) are shown at 166 and 168 to extend from the top and bottom spring flanges 162, 164 respectively, to localize the clamping forces imparted to the discs 106. It will be noted that corresponding nodes 170 are provided in the disc support flange 154 of the hub 152 (as shown in FIG. 3). The nodes 166, 168 and 170 nominally align along a common radius from the central axis 153.

Figure 11:
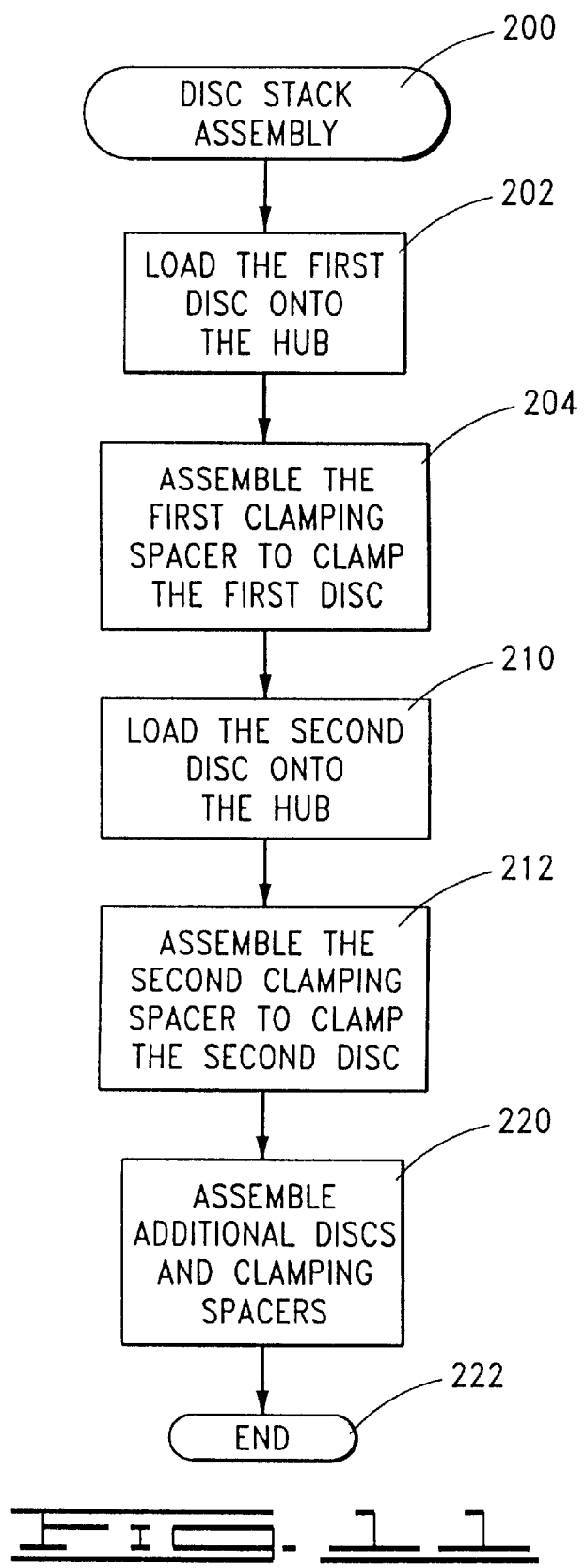
FIG. 11 is a flow chart for a DISC STACK ASSEMBLY routine, generally setting forth preferred steps carried out to assemble the discs and clamping spacers onto the spindle motor hub.

FIGS. 7–11 have been provided to illustrate the manner in which the clamping spacers 108 operate to individually clamp the discs 106. FIGS. 7–10 present schematic diagrams of the spindle motor hub 152, support flange 154, discs 106 and clamping spacers 108. For simplicity, each of the clamping spacers 108 have been represented in a general "wishbone" configuration. FIG. 11 provides a flow chart for a DISC STACK ASSEMBLY routine 200, illustrating preferred steps utilized to assemble the disc stack.

Beginning at step 202 in FIG. 11 and with reference to FIG. 7, the first disc 106 is loaded onto the hub 152 and brought to rest upon the disc support flange 154. At step 204, the first clamping spacer 108 is assembled onto the first disc 106. This is preferably accomplished by heating the first clamping spacer so that the hub contact surface 158 achieves a larger radius than the radius of the hub outer surface 160. This allows the first clamping spacer 108 to slip over the hub 152 and down to the first disc 106, where a desired amount of clamping force is imparted to the first clamping spacer 108 until the clamping spacer 108 cools and engages the hub outer surface 160 with an interference fit. The clamping force applied during this step is indicated by vector 206 in FIG. 7 and is transmitted through the body portion of the clamping spacer, resulting in the exertion of a force by the bottom spring flange 164 against the first disc 106. Of course, an equal and opposite force is necessarily exerted by the disc support flange 154 at this time (in accordance with Newton's First Law), but such has not been schematically represented for purposes of clarity.

As shown in FIG. 8, once step 204 is completed so that the first clamping spacer 108 is rigidly affixed to the hub 152, the top spring flange 162 of the first clamping spacer 108 will return to a normal, unloaded position. However, the bottom spring flange 164 will continue to bear against the first disc 106, so that the first disc 106 is clamped between the bottom spring flange 164 and the disc support flange 154, as indicated by vectors 208.

Continuing with the flow of FIG. 11 and with reference to FIG. 9, at step 210 the second disc 106 is loaded onto the hub 152 so as to come to rest upon the top spring flange 162 of the first clamping spacer 108. At step 212, the second clamping spacer 108 is assembled onto the second disc 106. This is preferably accomplished by heating the second clamping spacer 108 so as to slide over the hub outer surface 160 and down to the second disc 106, where a desired amount of clamping force is imparted to the second clamping spacer 108 until the second clamping spacer 108 cools and engages the hub outer surface 160. The force applied to the second clamping spacer 108 is indicated by vector 214 in FIG. 9.

As before, the application of the force indicated by vector 214 will result in exertion of a force by the bottom spring flange 164 of the second clamping spacer 108 against the second disc 106. However, unlike the clamping of the first disc (FIGS. 7 and 8) which was accomplished against a nominally rigid disc support flange 154, the clamping of the second disc 106 is between adjacent clamping spacers 108, so that both the bottom spring flange 164 of the second clamping spacer 108 and the top spring flange 162 of the first clamping spacer 108 will be slightly deflected. Thus, once the second clamping spacer 108 has cooled (and has thereby become rigidly affixed to the hub 152), the second disc 106 is clamped between the bottom spring flange 164 of the second clamping spacer 108 and the top spring flange 162 of the first clamping spacer 108, as shown in FIG. 10. This clamping force is indicated by vectors 216 and is independent of the force utilized to clamp the first disc 106 (indicated by vectors 208). Thus, the spring flanges 162 and 164 advantageously operate to isolate the clamping forces upon each individual disc 106, in contrast to the prior art system of FIG. 2 wherein the clamping forces established by the single disc clamp 138 and the disc support flange 134 uniformly extend through the entirety of the stack of discs 106 and spacers 136.

Although the diagrams of FIGS. 7–10 only illustrate the clamping of the first two discs 106, it will be apparent that the same operation is continued as previously explained until the total number of desired discs 106 have been added to the hub 152. This continued operation is generally shown at step 220 in FIG. 11, after which the routine ends at step 222. Of course, in a two disc stack, the operation of step 220 is unnecessary.

It will now be apparent that the clamping spacers 108 provide substantially improved mechanical shock resistance performance for the disc drive 100 as compared to the prior art system of FIG. 2. The same relationships set forth by equations (1) and (2) above still apply to the disc stack formed using the clamping spacers 108; however, by isolating the clamping to individual discs 108, the mass $m_{DS}$ no longer represents the total mass of all of the discs and spacers, but instead is reduced to the mass of each individual disc.

Neglecting the mass of the prior art spacers 136, in a five disc stack the mass $m_{DS}$ is reduced by a factor of five, so that the same clamping force results in substantially five times as great mechanical shock resistance. Using the example above wherein a 1000 newton (225 lbs-force) clamping force by the prior art clamp 138 of FIG. 2 can resist a mechanical shock resistance of up to around 200 g, the same clamping force applied by each of the clamping spacers 108 of FIGS. 3–10 can resist a mechanical shock of up to around 1000 g. Thus, the clamping spacers 108 can provide substantially greater maximum levels of mechanical shock resistance over the prior art.

Contrawise, the clamping force imparted to each of the clamping spacers 108 during assembly can be substantially reduced as compared to the prior art to achieve the same level of mechanical shock resistance, improving the manufacturability of the disc drive 100.

It will be noted that the prior art system of FIG. 2 generally requires only one thermal expansion operation, whereas the routine of FIG. 11 generally carries out multiple thermal expansion operations (in relation to the number of clamping spacers 108). Of course, the effects of such operations on manufacturing throughputs may be nominal, depending upon the particular processes employed. On the other hand, the use of thermal expansion techniques has been merely for purposes of presenting presently preferred embodiments and it is contemplated that other assembly techniques may be readily employed to rigidly affix the clamping spacers 108 to the hub outer surface 160. For example, it is contemplated that the configuration of the clamping spacers 108 could be readily modified to exert a spring force against the hub outer surface 160 instead of a thermal expansion induced interference fit.

It is further contemplated that in an alternative embodiment, the spindle hub 152 is not provided with the disc support flange 154; instead, an additional clamping spacer 108 is used in its place. In both cases the respective element (disc support flange 154 or additional clamping spacer 108) is referred to hereinbelow as a disc support member and includes a disc support surface (such as the node 170 for the disc support flange 154 and the node 168 for the clamping spacer 108).

From the foregoing, it will be recognized that the present invention is directed to an apparatus and method for improving mechanical shock resistance of a disc drive. As exemplified by a preferred embodiment, a disc drive 100 includes a spindle motor 104 with a rotatable hub 152 having a circumferentially extending hub outer surface 160 and a disc support member 154. The rotatable hub 152 is configured to rotate at least first and second discs 106.

A clamping spacer 108 includes a circumferentially extending body portion 156 having a hub contact surface 158 rigidly affixed to the hub outer surface 160. The clamping spacer 108 further includes first and second spring flanges 162, 164 which extend radially from the body portion 156 away from the spindle motor hub 152, wherein the body portion and the first and second spring flanges form a generally c-shaped cross-section.

The first spring flange 162 exerts a first axially directed clamping force 208 upon the first disc 106 and the second spring flange 164 independently exerts a second axially directed clamping force 216 upon the second disc 106.

Preferably, the discs 106 are assembled by loading the first disc 106 onto the spindle motor hub 152 to bring the first disc to rest upon the disc support member 154 (step 202, FIG. 11). The first clamping spacer 108 is next assembled onto the spindle motor hub 152 (step 204). This is preferably carried out by affixing the first clamping spacer 108 to the hub outer surface 160 while applying an axially directed clamping force 206 to the first clamping spacer 108 so that, once the first clamping spacer 108 is affixed to the hub outer surface 160, the desired clamping force 208 is exerted upon the first disc 106 by the second spring flange 164 of the first clamping spacer 108.

The second disc 106 is next loaded onto the spindle motor hub 152 and brought to rest onto the first spring flange 162 of the first clamping spacer 108 (step 210). The second clamping spacer 108 is assembled onto the hub outer surface 160 (step 212). This is preferably accomplished by imparting an axially directed force 214 to the second clamping spacer 108 so that, once the second clamping spacer 108 is affixed to the hub outer surface 160, the desired clamping force 216 is exerted upon the second disc 106 by the first spring flange 162 of the first clamping spacer 108 and the second spring flange 164 of the second clamping spacer 108. Thermal expansion operations are preferably carried out to achieve interference fits between hub outer surface 160 and the first and second clamping spacers 108, respectively.

For purposes of the appended claims, the recited function of "independently clamping the first and second discs" will be understood to be carried out by the disclosed spacer 108 with inner surface 158 which contactingly engages the hub outer surface 160 to rigidly affix the spacer 108 to the hub 152.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An apparatus for individually clamping discs to a spindle motor hub in a disc drive, comprising:
    a circumferentially extending body portion having a hub contact surface configured to contact the spindle motor hub to rigidly affix the apparatus to the spindle motor hub; and
    first and second spring flanges which extend radially from the body portion away from the spindle motor hub so that the body portion and the first and second spring flanges form a generally c-shaped cross-section, wherein the first spring flange exerts a first axially directed clamping force upon a first disc and the second spring flange independently exerts a second axially directed clamping force upon a second disc when the body portion is affixed to the spindle motor hub between the first and second discs.

2. The apparatus of claim 1, wherein each of the first and second spring flanges comprises a circumferentially extending bump to localize the first and second clamping forces upon the first and second discs, respectively.

3. The apparatus of claim 1, wherein the hub contact surface has a diameter selected in relation to a diameter of the spindle motor hub so that the apparatus is operably configured to form an interference fit with the spindle motor hub.

4. A disc drive, comprising:
    a spindle motor comprising a rotatable hub having a circumferentially extending hub outer surface;
    a disc support member extending from the hub;
    first and second clamping spacers each comprising a body portion contactingly engaging the hub outer surface to rigidly affix the first and second clamping spacers to the hub outer surface, and first and second spring flanges which extend radially from the body portion away from the hub support surface, the body portion and the first and second spring flanges forming a generally c-shaped cross-section;
    a first disc disposed between the first clamping spacer and the disc support member, the first disc clamped relative to the spindle motor hub in relation to a first set of clamping forces exerted upon the first disc by the second spring flange of the first clamping spacer and the disc support member; and
    a second disc disposed between the first and second clamping spacers, the second disc clamped relative to the spindle motor hub in relation to a second, independent set of clamping forces exerted upon the second disc by the first spring flange of the first clamping spacer and the second spring flange of the second clamping spacer.

5. The disc drive of claim 4, wherein the disc support member comprises a disc support flange which is integral with and radially extends from the spindle motor hub.

6. The disc drive of claim 4, wherein the disc support member comprises a third clamping spacer nominally identical to the first and second clamping spacers, wherein the first disc is clamped between the second spring flange of the first clamping spacer and a first spring flange of the third clamping spacer.

7. The disc drive of claim 4, wherein each of the first and second spring flanges comprises a circumferentially extending bump to localize the first and second clamping forces upon the first and second discs, respectively.

8. A disc drive, comprising:
    first and second discs disposed about a spindle motor hub; and
    means for independently clamping the first and second discs relative to the spindle motor hub and establishing a desired spacing between the first and second discs.

9. The disc drive of claim 8, wherein the clamp means comprises a clamping spacer disposed between the first and second discs, the clamping spacer comprising:
    a circumferentially extending body portion having a hub contact surface which contactingly engages the spindle motor hub to rigidly affix the clamping spacer to the spindle motor hub; and
    first and second spring flanges which extend radially from the body portion away from the spindle motor hub, wherein the body portion and the first and second spring flanges form a generally c-shaped cross-section, and wherein the first spring flange exerts a first axially directed clamping force upon the first disc and the second spring flange independently exerts a second axially directed clamping force upon the second disc.

10. The disc drive of claim 9, wherein each of the first and second spring flanges comprises a circumferentially extending bump to localize the first and second clamping forces upon the first and second discs, respectively.

* * * * *